(12) United States Patent
Tominaga et al.

(10) Patent No.: US 7,721,865 B2
(45) Date of Patent: May 25, 2010

(54) SEGMENT-TYPE FRICTION MATERIAL

(75) Inventors: Masaki Tominaga, Kasugai (JP); Masayuki Mizuno, Seto (JP)

(73) Assignee: Aisin Kako Kabushiki Kaisha, Toyota-Shi, Aichi-Ken (JP)

( * ) Notice: Subject to any disclaimer, the term of this patent is extended or adjusted under 35 U.S.C. 154(b) by 382 days.

(21) Appl. No.: 11/714,140

(22) Filed: Mar. 6, 2007

(65) Prior Publication Data

US 2007/0205075 A1 Sep. 6, 2007

(30) Foreign Application Priority Data

Mar. 6, 2006 (JP) .............................. 2006-059374

(51) Int. Cl.
*F16D 13/64* (2006.01)
*F16D 69/00* (2006.01)

(52) U.S. Cl. .............................. 192/107 R; 192/113.36; 188/264 E (58) Field of Classification Search ............ 192/113.36; 188/264 E
See application file for complete search history.

(56) References Cited

U.S. PATENT DOCUMENTS 5,998,311 A * 12/1999 Nels ........................... 442/203

FOREIGN PATENT DOCUMENTS

JP          2005-299731 A      10/2005

* cited by examiner

*Primary Examiner*—Richard M. Lorence
(74) *Attorney, Agent, or Firm*—Buchanan Ingersoll & Rooney PC (57) ABSTRACT

A segment-type friction material has blocks each composed of four segment pieces. Five blocks are stuck by adhesion to a core metal 2 along an entire circumference thereof so as to constitute one surface of the segment-type friction material. Gaps are provided between the five blocks to form oil grooves that make an automatic transmission fluid (ATF) to flow. Five oil grooves are formed in total on one surface as a whole of the segment-type friction material.

11 Claims, 4 Drawing Sheets

SEGMENT-TYPE FRICTION MATERIAL

BACKGROUND OF THE INVENTION

1. Field of the Invention

This invention relates to a wet friction material that generates a torque by applying a high pressure to an opposite surface while being immersed in an oil. In detail, this invention relates to a segment-type friction material made by joining segment pieces made of a friction material substrate on one or both of opposite surfaces of a core plate or a core plate of a flat ring shape along an entire circumference thereof. Each of the friction material substrates is cut into a segment piece shape. Particularly, this invention relates to a segment-type friction material that enables yield to be improved while making heat-resistance better.

2. Description of the Related Art

In recent year, a segment-type friction material as a wet friction material is under development in order to improve material yield with resultant cost reduction and to lessen drag torque with resultant high fuel efficiency in a vehicle. The segment-type friction material has a core plate of a flat ring shape and segment pieces. The segment pieces are made by cutting a friction material substrate along the ring shape or a circumferential direction of the core plate. A set of the segment pieces are arranged and joined with an adhesive on a front surface of the core plate side by side along an entire circumference of the core plate with a gap to be an oil groove. Another set of the segment pieces made by cutting the friction material substrate are joined with the adhesive to a rear surface of the core plate, too. Such segment-type friction material is applicable to a friction material clutch device that has a single or plural friction plates and that is used in an automatic transmission, which may be referred to as "AT" hereafter, of automobiles or a transmission of motorcycles or the like.

A ring-type friction material is used at another portion of the automatic transmission. The ring-type friction material is made by cutting a friction material substrate into a ring shape and sticking it to a core plate of a flat ring plate shape by an adhesive. However, there is a problem that the ring-type friction material has very low yield in the friction material substrate. Therefore, it is proposed to make very small an interval between the segment pieces of the segment-type friction material or remove the interval thereof. In this case, it is guessed that the segment-type friction material has a similar friction property to that of the ring-type friction material.

Thereby, it is expected that the segment-type friction material shows similar characteristics to that of the ring-type friction material in supplying an automatic transmission fluid (may be referred to as simply "ATF" hereafter). However, in a conventional manufacturing apparatus, there is still a problem that it is impossible to arrange and stick the segment piece on the core metal without an interval between the adjacent segment pieces.

In view of the above, the inventors provide an improved segment-type friction material and its manufacturing method as shown in Japanese Laid Open Patent Publication No. 2005-299731. In this segment-type friction material, the interval between the adjacent segment pieces is made very small or removed. Thereby, the segment-type friction material is given a similar friction property to that of the ring-type friction material, while reducing costs.

Still, the segment-type friction material is required to have a variety of friction characteristics according to use. In order to satisfy various requirements, the segment-type friction material is manufactured such that an interval is provided between the segment pieces as an oil groove. Then, the manufactured segment-type friction material makes a number or position of the oil grooves changed in different manners, thereby satisfying a required frictional property. Moreover, in case of lessening the number of the oil grooves, segment pieces are cut out into a long size or into a wide angled arc. Then, a few number of the long segment pieces are stuck on the core metal so as to cope with the requirement.

In punching out the segment pieces from a band-shaped friction material substrate, a radius of an inner circumference of the segment piece is set equal to a radius of an outer circumference thereof. This is to enable the segment pieces to be cut out successively from an upper side to a lower side (in a longitudinal direction) of the band-shaped friction material substrate. With such cutting operation, no unused portion is remained between the inner circumference and the outer circumference of the adjacent punched-out segment pieces. However, in case of cutting out the long-sized or wide-angled segment pieces, there is a disadvantage that a size in a direction perpendicular to a circumferential direction of the segment piece becomes shorter toward circumferentially opposite ends. Consequently, the yield of the friction material substrate is lowered and a lining area of the segment piece becomes small.

In addition, the segment pieces are to be cut out or punched out into different shapes according to a required position and a required number of the oil grooves for satisfying a certain frictional property. For example, some oil grooves may be arranged to each other at a large distance or at a large angle in one area of the segment-type friction material, while other oil grooves being arranged to each other at a short or medium distance or at a small or medium angle in another area thereof. In this case, it is necessary to prepare two or three kinds (long, medium, short) of segment pieces having a different circumferential length or a different arc angle. That is, one of the segment pieces should have a long size or a wide arc angle so as to be disposed in the one area where the oil grooves are positioned at the large distance. The other of the segment pieces should have a short or medium size or a small or medium arc angle so as to be disposed in the other area where the oil grooves are positioned at the short or medium distance. Therefore, in this case, it is necessary to design and make two or three types of cutting edges for punching out the two kinds of segment piece having different sizes, respectively, in accordance with the size difference (long, medium, short) of the segment pieces. Moreover, the cut-out segment pieces are arranged on the flat ring-shaped core metal, respectively, while rotating the core metal at a prescribed angle by a core metal rotating unit. However, in this case, the core metal rotating unit should be designed and fabricated such that it rotates the core metal at different two or three intervals in accordance with the size difference of the segment pieces. As described above, it is indispensable to design and form different cutting edges and different core metal rotating units in order to cutting out different shapes of segment pieces and to rotate the core metal at different angles for adhesion of the segment pieces. Such design and manufacture may increase costs and make a manufacturing efficiency worse.

The above description relating to "number and position of the oil grooves to obtain a desired frictional property" is not a description as prior art. It is explained herein just as a technique related to an object of the present invention. The applicants do not admit the description as prior art.

BRIEF SUMMARY OF THE INVENTION

It is an object of the present invention to provide a segment-type friction material that keeps high a yield of a friction material substrate even in case of lessening a number of oil grooves, while enabling a same cutting edge and a same core metal rotating unit to be used so as to maintain costs low and manufacturing efficiency high, thereby being assured to obtain a required frictional property.

According to a first aspect of the present invention, there is provided a segment-type friction material comprising a core metal of a flat ring shape. A predetermined number of segment pieces are out from a friction material substrate and adhere to one surface or both surfaces of the core metal along an entire circumference of the core metal. The predetermined number of the segment pieces are divided into a plurality of divisions. The divisions include at least a block made up of a plurality of the segment pieces joined closely to each other and adhering to the core metal. Oil grooves are formed between the divisions, respectively, in accordance with required positions and number of the oil grooves.

In a more preferred segment-type friction material, each of the segment pieces preferably has substantially a sector shape with a center angle of about eight to sixteen degrees. The divisions include a plurality of the blocks each made up of a plurality of the segment pieces joined closely to each other and adhering to the core metal. A number of the segment pieces making up each of the blocks is set such that the number and the positions of the oil grooves coincide with the required positions and number of the oil grooves.

In a more preferred segment-type friction material, each of the segment pieces has substantially a sector shape. The predetermined number of the segment pieces is not less than twenty to not more than forty so that the predetermined number of the segment pieces is arranged on the surface of the core metal along the entire circumference of the core metal. The divisions include a plurality of the blocks each made up of a plurality of the segment pieces joined closely to each other and adhering to the core metal. A number of the segment pieces making up each of the blocks is set such that the number and the positions of the oil grooves coincide with the required positions and number of the oil grooves.

In a more preferred segment-type friction material, the divisions include at least two of a first division made up of a single segment piece, a second division made up of a first plurality of the segment pieces and a third division made up of a second plurality of the segment pieces that is more than the first plurality of the segment pieces. The divisions are arranged on the surface of the core metal along the circumference of the core metal such that the number and the positions of the oil grooves coincide with the required positions and number of the oil grooves.

In a more preferred segment-type friction material, a number of the segment piece making up each of the divisions and an arrangement of the divisions along the circumference of the core metal are set such that the number and the positions of the oil grooves coincide with the required positions and number of the oil grooves.

In a more preferred segment-type friction material, the divisions include at least two of a first division made up of a single segment piece, a second division made up of a first plurality of the segment pieces and a third division made up of a second plurality of the segment pieces that is more than the first plurality of the segment pieces. The divisions are arranged on the surface of the core metal along the circumference of the core metal such that a pitch of the oil grooves becomes uneven along the circumference of the core metal.

In a more preferred segment-type friction material, each of the segment pieces has substantially a sector shape defined by a right edge, a left edge, an outer circumference and a inner circumference. A radius of the outer circumference and a radius of the inner circumference of the segment piece are set equal to each other. The predetermined number of the segment pieces is not less than twenty to not more than forty so that the predetermined number of the segment pieces is arranged on the surface of the core metal along the entire circumference of the core metal.

In the inventive segment-type friction material, the segment piece is preferably formed into a short length in a circumferential direction or a narrow center angle, while the radius of the outer circumference and the radius of the inner circumference of the segment piece are set equal to each other. In this case, there takes place scarcely an influence that a width (a dimension perpendicular to a circumferential direction of the segment piece) of the segment piece becomes less toward opposite ends thereof. Accordingly, a yield of the friction material substrate is not deteriorated.

Moreover, a desired number of a plurality of such short segment pieces are stuck by adhesion to the core metal, while being closely touched to each other, in accordance with required positions and number of the oil grooves. The segment pieces are not closely touched to each other at a position of the oil groove so as to provide a gap between the segment pieces. Thus, the segment-type friction material with the short or narrow angled segment pieces has a similar frictional property to that of a segment-type friction material that has a long or wide angled segment pieces and that arranges the long segment pieces one by one with a gap therebetween.

Furthermore, the inventive segment-type friction material is able to easily deal with a change of the required positions and number of the oil grooves by changing the number of the short segment pieces that adhere to the core metal while being closely joined to each other. Then, it is enough for the inventive segment-type friction material to use only one kind or just one size (same size) of segment pieces. Consequently, even if the segment piece has a difference shape at one side closely touched and another side facing the oil groove, a punching-out cutter and a core metal rotating unit can be fabricated as the same design. That is, the same design of the punching-out cutter and the core metal rotating unit can be used in manufacturing the inventive segment-type friction material. Consequently, the inventive segment-type friction material can be manufactured at low costs and have an improved manufacturing efficiency.

In the inventive segment-type friction material, the radius of the outer circumference and the radius of the inner circumference of the segment piece are set equal to each other. Consequently, the same size and same shape of the segment pieces can be punched out successively from an upper side to a lower side of the band-shaped friction material substrate. Moreover, the segment pieces can be punched out just by providing small gaps at right and left sides, respectively. Consequently, the material yield can be very much heightened, thereby reducing the costs very much.

As described above, the inventive segment-type friction material keeps high a yield of a friction material substrate even in case of lessening a number of oil grooves, while enabling a same cutting edge and a same core metal rotating unit to be used so as to maintain costs low and manufacturing efficiency high, thereby being assured to obtain a required frictional property.

The predetermined number of the short segment pieces is preferably not less than twenty to not more than forty so that the predetermined number of the segment pieces is arranged on the surface of the core metal along the entire circumference of the core metal. In this case, 360 degrees divided by 20 equal to 18 degrees and 360 degrees divided by 40 equal to 9 degrees. Then, the right and left sides of the segment piece make a center angle of 9 to 18 degrees.

In case the size of the segment piece is set such that the number of the segment pieces becomes less than twenty along the entire circumference of the core metal of the flat ring shape, the size of the segment piece is too large to cope with a variety of required positions and number of the oil grooves. On the other hand, if the size of the segment piece is set such that the number of the segment pieces becomes more than forty along the entire circumference of the core metal of the flat ring shape, the number of the used segment pieces too much, so that the manufacturing efficiency of the segment-type friction material is lowered. As in the invention, if the size of the short segment piece is set such that the number of the segment pieces becomes not less than twenty to not more than forty along the entire circumference of the core metal of the flat ring shape, the inventive segment-type friction material is able to flexibly cope with a variety of required positions and number of the oil grooves. Moreover, it is possible to prevent the manufacturing efficiency from being deteriorated.

The preferred segment-type friction material arranges the oil grooves, which are formed between the divisions (the blocks or a single segment piece), at different pitches along the circumference of the core metal. That is, the number of the closely joined short segment pieces making up the block is not even but varied according to the kinds of the blocks. Specifically, the different kinds of the divisions including the different kinds of the blocks and/or the single segment piece are arranged regularly or irregularly along the entire circumference of the segment-type friction material.

Accordingly, since the pitches of the oil grooves are uneven, it is expected that anti-judder characteristics of the inventive segment-type friction material improve more.

Further objects and advantages of the invention will be apparent from the following description, reference being had to the accompanying drawings, wherein preferred embodiments of the invention are clearly shown.

DETAILED DESCRIPTION OF THE INVENTION

Several embodiments of the invention are described hereunder referring to the attached drawings. The same reference character is used to show the same element throughout the several embodiments.

First Embodiment

A segment-type friction material according to a first embodiment of the present invention is described hereafter referring to FIG. 1a to FIG. 5b.

Figure 1A:
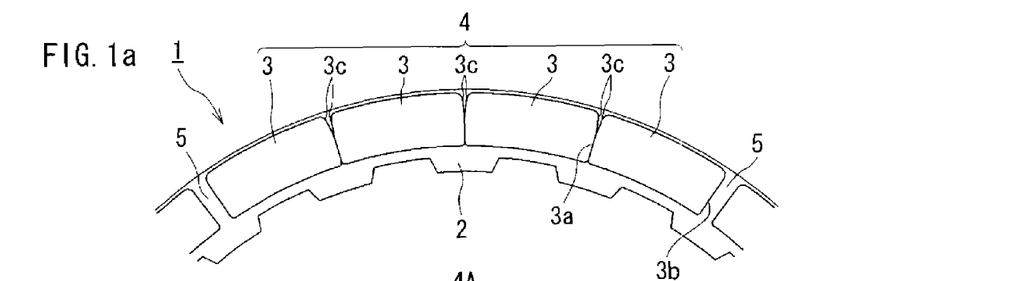
FIG. 1a is a partial plan view showing an arrangement of segment pieces in a segment-type friction material according to a first example as an example of a first embodiment of the present invention.
Figure 1B:
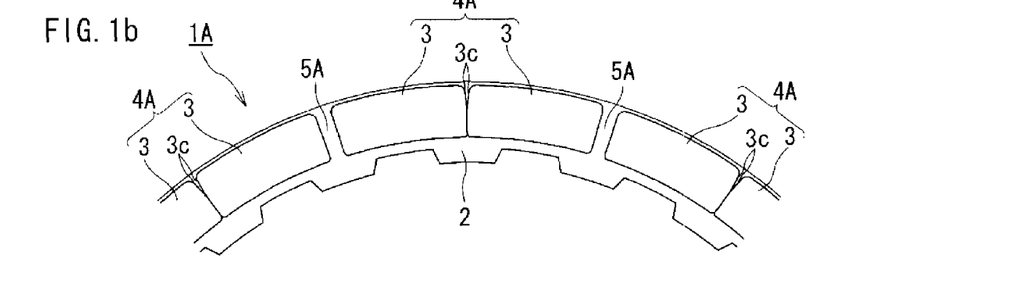
FIG. 1b is a partial plan view showing an arrangement of segment pieces in a segment-type friction material according to a second example as an example the first embodiment of the present invention.
Figure 2A:
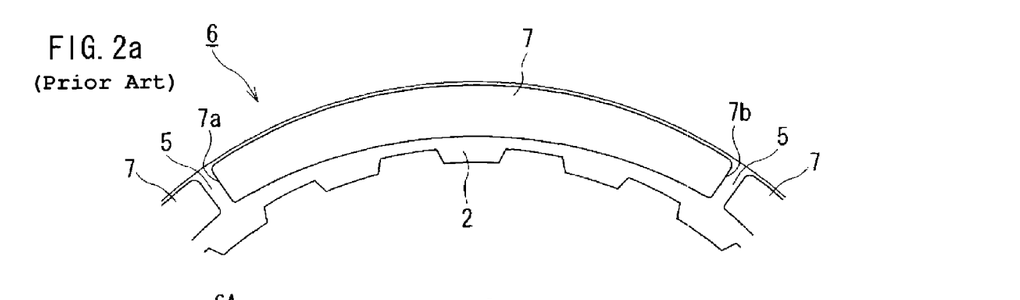
FIG. 2a is a partial plan view showing an arrangement of segment pieces in a segment-type friction material according to a first comparative example of a related art.
Figure 2B:
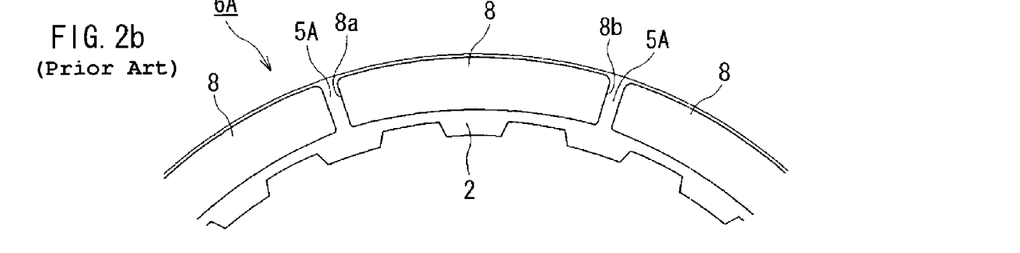
FIG. 2b is a partial plan view showing an arrangement of segment pieces in a segment-type friction material according to a second comparative example of the related art.

FIG. 1a is a partial plan view showing an arrangement of segment pieces in a segment-type friction material according to a first example as an example of a first embodiment of the present invention. FIG. 1b is a partial plan view showing an arrangement of segment pieces in a segment-type friction material according to a second example as an example the first embodiment of the present invention. FIG. 2a is a partial plan view showing an arrangement of segment pieces in a segment-type friction material according to a first comparative example of a related art. FIG. 2b is a partial plan view showing an arrangement of segment pieces in a segment-type friction material according to a second comparative example of the related art.

Figure 3:
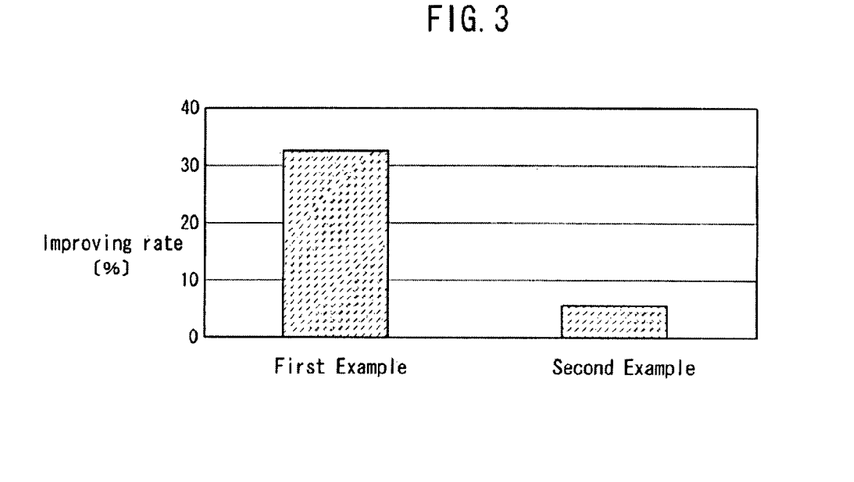
FIG. 3 is a bar graph showing an improving rate of a yield in the segment-type friction material according to the first example and the second example of the first embodiment of the present invention.
Figure 4A:
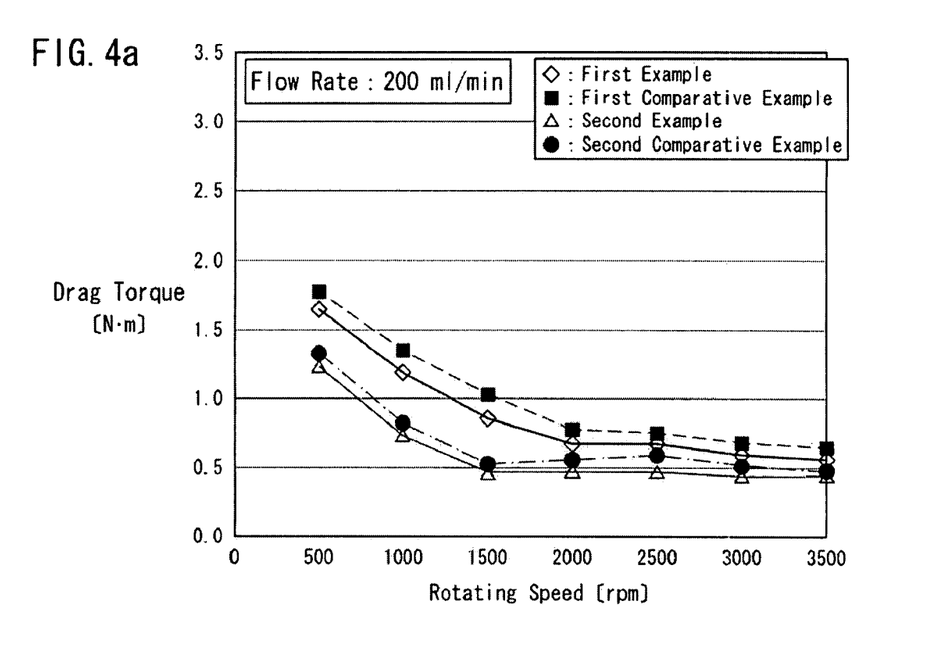
FIG. 4a is a graph showing measurement results of drag torques in the segment-type friction material according to the first example and the second example of the first embodiment of the present invention and those of the segment-type friction material according to the first comparative example and the second comparative example of the related art, wherein the results were measured at a flow rate of an automatic transmission fluid (ATF) of 200 ml per minute.
Figure 4B:
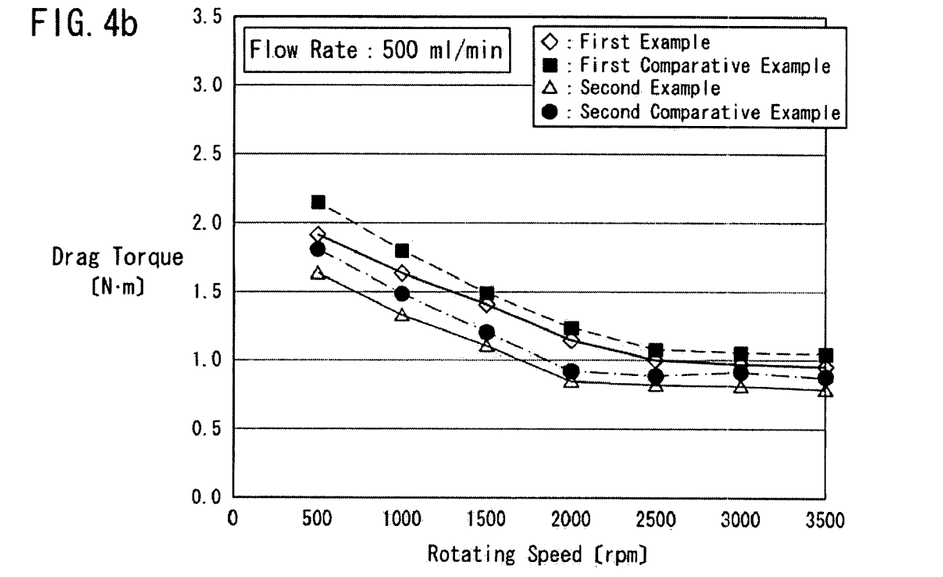
FIG. 4b is a graph showing measurement results of drag torques in the segment-type friction material according to the first example and the second example of the first embodiment of the present invention and those of the segment-type friction material according to the first comparative example and the second comparative example of the related art, wherein the results were measured at a flow rate of an automatic transmission fluid (ATF) of 500 ml per minute.

FIG. 3 is a bar graph showing an improving rate of a yield in the segment-type friction material according to the first example and the second example of the first embodiment of the present invention. FIG. 4a is a graph showing measurement results of drag torques in the segment-type friction material according to the first example and the second example of the first embodiment of the present invention and those of the segment-type friction material according to the first comparative example and the second comparative example of the related art, wherein the results were measured at a flow rate of an automatic transmission fluid (ATF) of 200 ml per minute. FIG. 4b is a graph showing measurement results of drag torques in the segment-type friction material according to the first example and the second example of the first embodiment of the present invention and those of the segment-type friction material according to the first comparative example and the second comparative example of the related art, wherein the results were measured at a flow rate of an automatic transmission fluid (ATF) of 500 ml per minute.

Figure 5A:
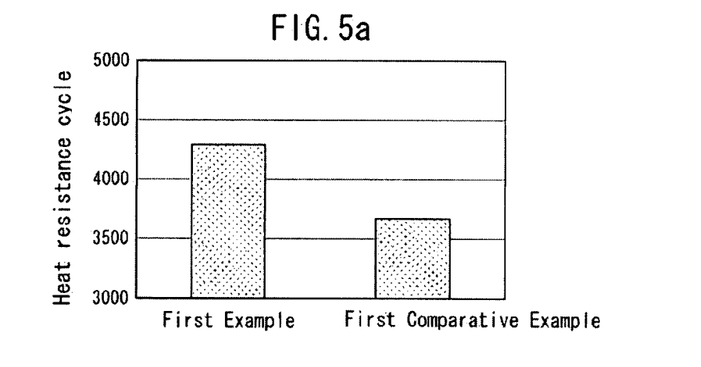
FIG. 5a is a bar graph showing a heat resistance of the segment-type friction material according to the first example of the first embodiment of the present invention, while comparing it with the first comparative example.
Figure 5B:
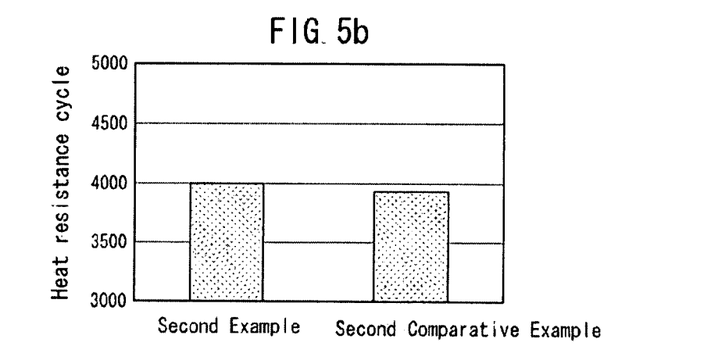
FIG. 5b is a bar graph showing a heat resistance of the segment-type friction material according to the first example of the first embodiment of the present invention, while comparing it with the first comparative example.

FIG. 5a is a bar graph showing a heat resistance of the segment-type friction material according to the first example of the first embodiment of the present invention, while comparing it with the first comparative example. FIG. 5b is a bar graph showing a heat resistance of the segment-type friction material according to the first example of the first embodiment of the present invention, while comparing it with the first comparative example.

As shown in FIG. 1a, a segment-type friction material 1 according to a first example as one example of the first embodiment of the invention is composed of segment pieces 3. Each of the segment pieces 3 has a sector shape or a trapezoidal shape defined by a left edge 3a, a right edge 3b, an outer circumferential edge and an inner circumferential edge. The right edge 3b and the left edge 3a of the segment piece 3 make a center angle of 18 degrees therebetween. The outer circumferential edge and the inner circumferential edge of the segment piece 3 have a same radius or curvature. Then, twenty segment pieces 3 can be arranged along a circle so as to define a ring shape if they are disposed closely to each other without any gap or interval between the right edge 3b and the left edge 3a. That is, 360 degrees divided by 18 degrees equal to twenty. Therefore, the segment-type friction material 1 has twenty segment pieces 3 disposed on one surface of a core metal 2 having a ring shape with a fixed radius. Moreover, the segment-type friction material 1 divides the twenty segment pieces 3 into several blocks. Specifically, the segment pieces 3 are stuck to the core metal 2 by adhesion, while four segment pieces 3 being joined closely to each other. In detail, five blocks 4 made by each four segment pieces 3 adhere to the one surface of the core metal 2 of the segment-type friction material 1 with a predetermined gap or interval between the blocks 4.

Five gaps or intervals are formed between the five blocks 4 so as to define five oil grooves 5 each permitting an automatic transmission fluid (ATF) to flow. That is, five oil grooves 5 are formed in total on one whole surface of the segment-type friction material 1. Thus, a number of the oil grooves 5 formed on the segment-type friction material 1 can be reduced to a large number in comparison with a conventional segment-type friction material in which a same number of segment pieces 3 are arranged separately to each other so as to form twenty gaps as oil grooves. Consequently, the segment-type friction material 1 has an improved anti-judder or anti-shudder performance. Moreover, the first example of the segment-type friction material 1 divides the twenty segment pieces 3 into the five blocks 4 so as to form the five oil grooves 5 at an angle of 72 degrees. Namely, the number and the angular position of the oil grooves 5 are set by the number of the segment pieces 3 and the number of the blocks 4 (how to divide the segment pieces 3). On the other hand, the frictional property of the segment-type friction material 1 depends on the number and angular position of the oil grooves 5 on the core metal 2. Therefore, it is very easy to control the frictional property including a drag torque of the segment-type friction material 1 to a desired frictional property only by setting the number of the segment pieces 3 and the number of the blocks 4 so as to set the number and the angular position of the oil grooves 5.

Each of the oil grooves 5 has a predetermined width equal or corresponding to the gap between the blocks 4 and a predetermined length equal or corresponding to the right or left edge 3a, 3b of the segment piece 3. The twenty segment pieces 3 may be separated into the five blocks 4 by moving each of the blocks 4a prescribed distance in a radial direction away from a closely arranged state of the segment pieces 3 in which they are disposed to each other without any gap between the right and left edges 3a and 3b. Then, the width of the oil groove 5 may be set to a required width, which is determined depending on a required frictional property of the segment-type friction material 1. Therefore, it is very easy to control the frictional property of the segment-type friction material 1 to a desired frictional property only by setting the moving distance of the segment pieces 3 away from the closely arranged state so as to form the gap as the oil groove 5 and set the width of the oil groove 5. The width of the oil groove 5 may change depending on a number of the oil grooves 5, a size or an area of each of the segment pieces 3, the number of blocks 4, an area of each block 4, etc. A size of the segment piece 3 is determined such that a dimension of a total of the outer circumferential edges of all the segment pieces 3 plus a total of the widths of the oil grooves 5 are less than an entire circumferential dimension of the core metal 2.

Both sides of the four segment pieces 3 forming the block 4 have cutouts 3c formed at circumferential corners except the sides facing the oil grooves 5. That is, the cutouts 3c are formed at the outer corners of all the closely touching sides of the four segment pieces 3, respectively. The cutout 3c of the segment piece 3 is provided for manufacturing use of the segment-type friction material 1. Specifically, the segment-piece 1 is manufactured by use of a rotating plate on which positioning pins are erected at an angle of 18 degrees along its circumference. In arranging the twenty segment pieces 3 in a predetermined formation corresponding to a formation on the core metal 2, the rotating plate is rotated 18 degrees each time the segment piece 3 is fed from an outside in a radial direction of the rotating plate onto a surface of the rotating plate. Then, adjoining two of the positioning pins serve to set each of the segment pieces 3 at a predetermined location on the rotating plate. However, another positioning device may be used to set the position of the segment piece 3 on the rotating plate in manufacturing the segment-type friction material 1. Then, the provision of the cutouts 3 on the segment piece 3 is not indispensable in the invention. At any rate, in manufacturing the segment-type friction material 1, the segment pieces 3 may be fed to the rotating plate at an angle of a fixed angle (18 degrees in the first example). In this state, the fixed number (20 in the first example) of the segment pieces 3 may be disposed closely to each other with the right and left edges 3a, 3b touched to each other. Then, each of the five blocks 4 of the segment pieces 3 may be integrally moved a fixed distance as one body by a sucking means or the like away from the center of the rotating plate, thereby forming five gaps as the oil grooves 5 between the five blocks 4. Alternatively, the rotating plate may be rotated a fixed angle when the four segment pieces 3 are fed and disposed, while being rotated a slight angle to form a gap as the oil groove 5 between the blocks 4 of the four segment pieces 3.

As shown in FIG. 1b, a segment-type friction material 1A according to a second example as one example of the first embodiment of the invention is composed of segment pieces 3, too. Then, the segment-type friction material 1A has twenty segment pieces 3 disposed on one surface of the core metal 2. In the second example, the segment pieces 3 are stuck to the core metal 2 by adhesion, while two segment pieces 3 are joined closely to each other. In detail, ten blocks 4A made by each two segment pieces 3 adhere to the one surface of the core metal 2 of the segment-type friction material 1A with a predetermined gap or interval between the blocks 4A.

Ten gaps or intervals are formed between the ten blocks 4A so as to define ten oil grooves 5A permitting the automatic transmission fluid (ATF) to flow. That is, ten oil grooves 5A are formed in total on one whole surface of the segment-type friction material 1A. Consequently, in the same manner as the first example, the segment-type friction material 1A has an improved anti-judder or anti-shudder performance. Moreover, the second example of the segment-type friction material 1A divides the twenty segment pieces 3 into the ten blocks 4A so as to form the ten oil grooves 5A at an angle of 36 degrees. Therefore, as described in the description for the first example, it is very easy to control the frictional property including a drag torque of the segment-type friction material 1A to a desired frictional property only by setting the number of the segment pieces 3 and the number of the blocks 4A so as to set the number and the angular position of the oil grooves 5A on the segment-type friction material 1A.

In contrast, as shown in FIG. 2a, a segment-type friction material 6 according to a first comparative example substitutes one segment piece 7 for each of the five blocks 4 each of which is formed by the four segment pieces 3. That is, the segment-type friction material 6 according to a first comparative example uses the segment piece 7 having a same length or a same center angle as the block 4 made of the four segment pieces 3 in the first example of the segment-type friction material 1. Such very long segment pieces 7 are cut out from the friction material substrate, respectively. The segment piece 7 has a left edge 7a and a right edge 7b. Then, the segment pieces 7 are stuck by adhesion to the core metal 2 with a predetermined gap therebetween. As shown in FIG. 2b, a segment-type friction material 6A according to a second comparative example substitutes one segment piece 8 for each of the ten blocks 4A each of which is formed by the two segment pieces 3. That is, the segment-type friction material 6A according to a first comparative example uses the segment piece 8 having a same length or a same center angle as the block 4A made of the two segment pieces 3 in the second example of the segment-type friction material 1A. Such long segment pieces 8 are cut out from the friction material substrate, respectively. The segment piece 8 has a left edge 8a and a right edge 8b. Then, the segment pieces 8 are stuck by adhesion to the core metal 2 with a predetermined gap therebetween.

Thus, the first comparative example of the segment-type friction material 6 has five oil grooves 5 defined between the right and left edges 7a and 7b of the segment pieces 7, as in the segment-type friction material 1 according to the first example in the first embodiment. The second comparative example of the segment-type friction material 6A has ten oil grooves 5A defined between the right and left edges 8a and 8b of the segment pieces 8, as in the segment-type friction material 1A according to the second example in the first embodiment. However, the first and the second comparative examples of the segment-type friction materials 6 and 6A have the following disadvantages. Specifically, in cutting out the segment pieces used for the segment-type friction material from the friction material substrate, they are cut out while making equal a radius of an outer circumference and a radius of an inner circumference.

It is possible to cut out the segment piece while making the radius of the outer circumference and the radius of the inner circumference to radii of a concentric circle so as to make constant a width (a dimension in a direction perpendicular to a circumference) of the segment piece along its circumferential direction. In this case, however, the radius of the outer circumference of the next cut-out segment piece does not coincide with the radius of the inner circumference of the previously cut-out segment piece. Then, there are produced chips or scrapes from the friction material substrate that are not contained in the segment piece, thereby lowering a yield in use of the friction material substrate. Moreover, the cutting chip must be taken away each time. Consequently, it is impossible to cut out or punch out the segment pieces successively, thereby deteriorating a production efficiency. This is the reason why the radii of the outer and inner circumferences of the segment piece are made equal.

Thus, the radius of the outer circumference and the radius of the inner circumference of the segment piece are made equal so as to enable the segment pieces to be cut out or punched out successively and improve the yield in use of the friction material substrate. As a result, as shown in FIG. 2a, the very long segment piece 7 of the segment-type friction material 6 of the first comparative example has a width gradually decreased toward the opposite ends or edges 7a and 7b. Accordingly, there is a problem that a lining area of the segment-type friction material 6 becomes less as a whole.

This problem takes place similarly in the case of the long segment-type friction material 6A of the second comparative example, as shown in FIG. 2b. Since the segment piece 8 of the segment-type friction material 6A is shorter than the segment piece 7 of the first example of the segment-type friction material 6, the above disadvantage is not so outstanding. However, the long segment piece 8 of the segment-type friction material 6A of the second comparative example has a width gradually decreased toward the opposite ends or edges 8a and 8b, too.

In contrast, as shown in FIG. 1a and FIG. 1b, the segment piece 3 in the first example and the second example of the segment-type friction material 1, 1A has a very short length. Therefore, there takes place scarcely an influence of making the radii of the outer and inner circumferences equal that the width of the segment piece 3 becomes smaller toward the opposite ends 3a and 3b. Consequently, the lining area of the segment-type friction material 1, 1A as a whole can be enlarged substantially to a maximum value.

The yield of the friction material substrate in each of the segment-type friction materials 1 and 1A according to the first and, second examples was compared with the yield in each of the segment-type friction materials according to the first and second comparative examples so as to check how much it is improved. The yield was evaluated by confirming how many segment pieces were produced from one roll of a standard friction material substrate. The test results are shown in FIG. 3.

As shown in FIG. 3, it was found that the yield was improved by 30% or more in the segment-type friction material 1 according to the first example in the first embodiment in comparison with the segment-type friction material 6 according to the first comparison example. Moreover, it was found that the yield was improved by 5% or more in the segment-type friction material 1A according to the second example in the first embodiment in comparison with the segment-type friction material 6A according to the second comparison example.

Next, a performance test as a friction material was conducted on the segment-type friction materials 1 and 1A according to the first embodiment and the segment-type friction materials according to the first comparison embodiment and the second comparison embodiment as the related art. First, a test for measuring a drag torque was conducted.

As the test conditions, a SAE#2 tester was used as a tester. Then, three segment-type friction materials as test pieces were assembled between four plates of the tester. A size of the segment-type friction material was 144.95 mm in its outside diameter and 127.95 mm in its inside diameter. The test was conducted within a range of a frictional rotating speed of 500 rpm to 3500 rpm, while stepping up the frictional rotating speed by 500 rpm each time, on a case in which the automatic transmission fluid (ATF) at an oil temperature of 40° C. was supplied as a lubricant oil from a lubricant oil hole at an oil amount of 200 ml/min and on a case in which the same automatic transmission fluid (ATF) was supplied at an oil amount of 500 ml/min, respectively.

The test results are shown in FIG. 4a and FIG. 4b. As shown in FIG. 4a and FIG. 4b, the segment-type friction material 1 according to the first example and the segment-type friction material 6 according to the first comparison example were compared with other. Then, it is found that the drag torque characteristics are nearly equal in case the oil amount is 200 ml/min and in case the oil amount is 500 ml/min. In the same way, the segment-type friction material 1A according to the second example and the segment-type friction material 6A according to the second comparison example were compared with other. Then, it is found that the drag torque characteristics are nearly equal, too.

Next, an evaluation test was carried out on a heat resistance. As test conditions, the same SAE#2 tester was used as a tester. Then, three segment-type friction materials as test pieces were assembled between four plates of the tester. A size of the segment-type friction material was 144.95 mm in its outside diameter and 127.95 mm in its inside diameter. A standard load duration evaluation was conducted at a frictional rotating speed of 7100 rpm and at a surface pressure of a piston of 0.785 MPa, while a automatic transmission fluid (ATF) at an oil temperature of 100° C. was supplied as a lubricant oil from a lubricant oil hole at an oil amount of 180 ml/min.

The results of the heat resistance test are shown in FIG. 5a and FIG. 5b. In FIG. 5a and FIG. 5b, a "heat resistance cycle" means a number of frictional cycles at a time when a frictional efficiency μ is lowered by 10% or a frictional surface of the segment-type friction material is abraded to a thickness of 60 μm. In this case, the tester was stopped at every 250 cycles to confirm the results.

As shown in FIG. 5a, it is found that the segment-type friction material 1 according to the first example has a heat resistance better than the segment-type friction material 6 according to the first comparative example. Similarly, as shown in FIG. 5b, it is found that the segment-type friction material 1A according to the second example has a heat resistance equal to or better than the segment-type friction material 6A according to the second comparative example.

The reason why the heat resistance is improved in the segment-type friction materials 1 and 1A according to the first embodiment could be interpreted as follows. That is, in case of the segment-type friction materials 6 and 6A according to the first comparative example and the second comparative example of the related art, the lining area is lessened in comparison with the ring-shaped friction material that is made by punching out the friction material substrate into an integral ring shape and adheres to the core metal. Thus, the heat resistance of the segment-type friction materials 6 and 6A is deteriorated accordingly. In contrast, in case of the segment-type friction materials 1 and 1A, the lining area is scarcely lessened. Accordingly, the heat resistance of the segment-type friction materials 1 and 1A is not essentially deteriorated.

As described above, the segment-type friction materials 1 and 1A according to the first embodiment keep high a yield of a friction material substrate even in case of lessening a number of the oil grooves 5 and 5A, while enabling a same cutting edge and a same core metal rotating unit to be used so as to maintain costs low and manufacturing efficiency high, thereby being assured to obtain a required frictional property.

Second Embodiment

A segment-type friction material according to a second embodiment of the present invention is described hereafter referring to FIG. 6a to FIG. 6d.

Figures 6A, 6B, 6C, 6D:
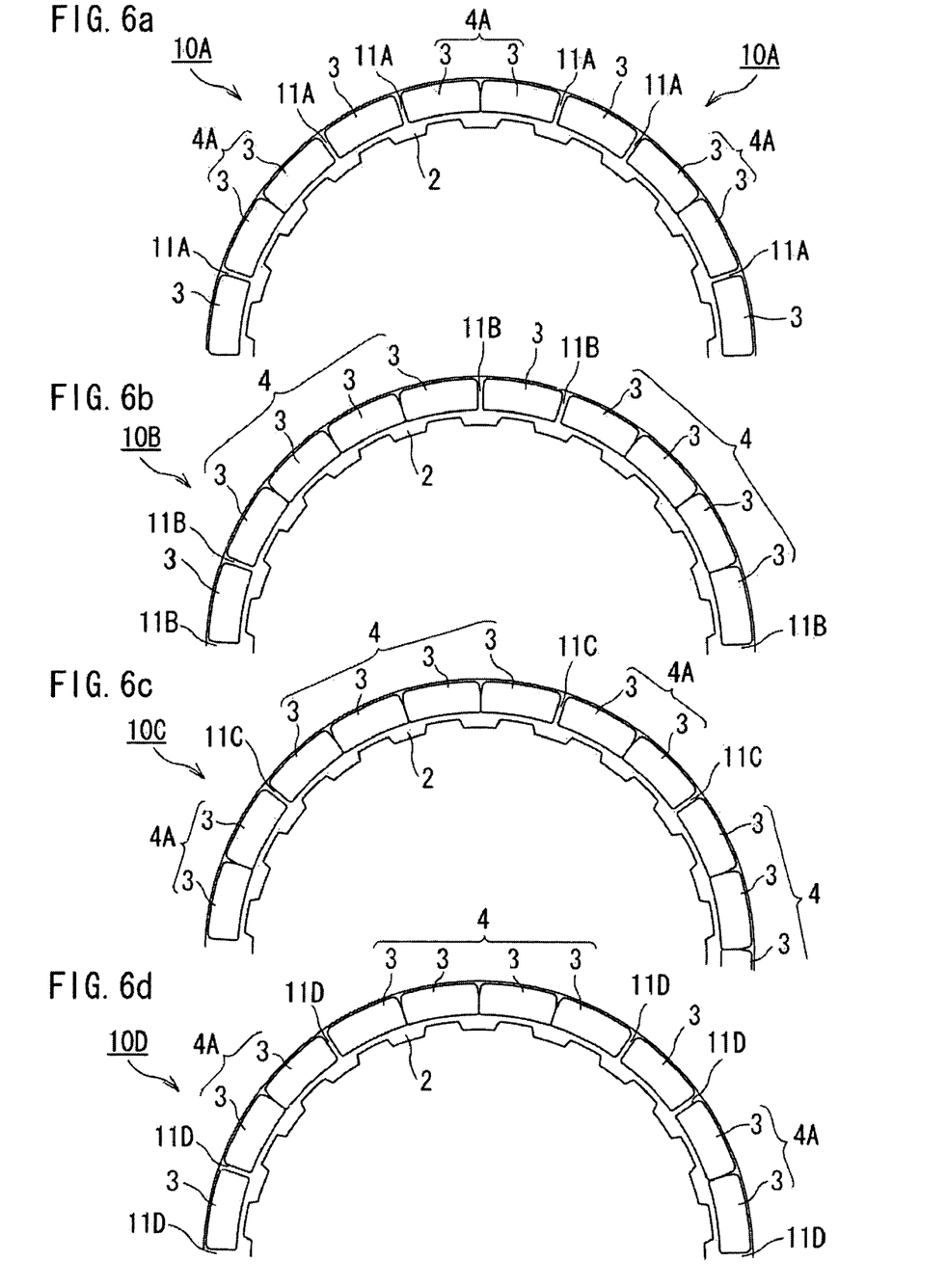
FIG. 6a is a partial plan view showing an arrangement of segment pieces in a segment-type friction material according to a third example as an example of a second embodiment of the present invention.
FIG. 6b is a partial plan view showing an arrangement of segment pieces in a segment-type friction material according to a fourth example as an example of the second embodiment of the present invention.
FIG. 6c is a partial plan view showing an arrangement of segment pieces in a segment-type friction material according to a fifth example as an example of the second embodiment of the present invention.
FIG. 6d is a partial plan view showing an arrangement of segment pieces in a segment-type friction material according to a sixth example as an example of the second embodiment of the present invention.

FIG. 6a is a partial plan view showing an arrangement of segment pieces in a segment-type friction material according to a third example as an example of a second embodiment of the present invention. FIG. 6b is a partial plan view showing an arrangement of segment pieces in a segment-type friction material according to a fourth example as an example of the second embodiment of the present invention. FIG. 6c is a partial plan view showing an arrangement of segment pieces in a segment-type friction material according to a fifth example as an example of the second embodiment of the present invention. FIG. 6d is a partial plan view showing an arrangement of segment pieces in a segment-type friction material according to a sixth example as an example of the second embodiment of the present invention.

The segment-type friction materials land 1A according to the first embodiment has only the same blocks 4 or blocks 4A adhere to the core metal 2 at a fixed interval. As shown in FIG. 6a, FIG. 6b, FIG. 6c and FIG. 6d, segment-type friction materials according to a second embodiment mixes different blocks 4 and 4A or a single segment piece 3.

Specifically, as shown in FIG. 6a, a segment-type friction material 10A according to a third example as one example of the second embodiment is composed of the segment pieces 3. Each of the segment pieces 3 has the same structure as that of the first example. The right edge 3b and the left edge 3a of the segment piece 3 make a center angle of 18 degrees therebetween. Then, 360 degrees of a ring shape is divided by 18 degrees so that twenty segment pieces 3 are disposed on one surface of the core metal 2 in the segment-type friction material 10A.

Moreover, as shown in FIG. 6a, the segment-type friction material 10A according to the third example arranges the block 4A, which is made by joining closely the two segment pieces 3, and the single segment piece 3 one next to the other at a predetermined interval. Thus, an oil groove 11A is formed between the block 4A and the segment piece 3. Accordingly, the oil grooves 11A are disposed at an uneven interval on the core metal 2. Consequently, the segment-type friction material 10A is given a particular frictional property in accordance with the uneven arrangement of the oil grooves 11A.

As shown in FIG. 6b, a segment-type friction material 10B according to a fourth example as one example of the second embodiment arranges the block 4, which is made by joining closely the four segment pieces 3, and the single segment piece 3 one next to the other at a predetermined interval. Thus, an oil groove 11B is formed between the block 4 and the segment piece 3. Accordingly, the oil grooves 11B are disposed at an uneven interval on the core metal 2. Consequently, the segment-type friction material 10B is given a particular frictional property in accordance with the uneven arrangement of the oil grooves 11B.

As shown in FIG. 6c, a segment-type friction material 10C according to a fifth example as one example of the second embodiment arranges the block 4, which is made by joining closely the four segment pieces 3, and the block 4, which is made by joining closely the two segment pieces 3A, one next to the other at a predetermined interval. Thus, an oil groove 11C is formed between the block 4 and the block 4A. Accordingly, the oil grooves 11C are disposed at an uneven interval on the core metal 2. Consequently, the segment-type friction material 10C is given a particular frictional property in accordance with the uneven arrangement of the oil grooves 11C.

As shown in FIG. 6d, a segment-type friction material 10D according to a sixth example as one example of the second embodiment arranges the single segment piece 3, the block 4, which is made by joining closely the four segment pieces 3, and the block 4, which is made by joining closely the two segment pieces 3A, in order at a predetermined interval. Thus, an oil groove 11D is formed between the segment piece 3, the block 4 and the block 4A. Accordingly, the oil grooves 11D are disposed at a far more uneven interval on the core metal 2. Consequently, the segment-type friction material 10D is given a particular frictional property in accordance with the uneven arrangement of the oil grooves 11D.

As described above, the segment-type friction materials 10A, 10B, 10C and 10D according to the second embodiment keep high a yield of a friction material substrate even in case of lessening a number of the oil grooves 11A, 11B, 11C and 11D, while enabling a same cutting edge and a same core metal rotating unit to be used so as to maintain costs low and manufacturing efficiency high, thereby being assured to obtain a required frictional property.

Moreover, a pitch of the oil grooves 11A, 11B, 11C and 11D is uneven in the segment-type friction materials 10A, 10B, 10C and 10D according to the second embodiment. Consequently, it is expected that the anti-judder performance is more improved in the segment-type friction materials 10A, 10B, 10C and 10D.

In the segment-type friction material 1, 1A, 10A, 10B, 10C, 10D of each of the above embodiments, the radius of the inner circumference of the segment piece 3 is set equal to the radius of the outer circumference thereof. Therefore, it is possible to punch out the segment pieces 3 successively from an upper side to a lower side (in a longitudinal direction) of the band-shaped friction material substrate. Consequently, the yield of the material is very much high.

Each of the aforementioned embodiments is described about the segment-type friction material 1, 1A, 10A, 10B, 10C, 10D that has the segment pieces 3 secured on the opposite surfaces of the core metal 2, as an example. However, the same function and effects can be obtained in a segment-type friction material that has the segment pieces only on one of the opposite surfaces of the core metal 2.

Moreover, each of the aforementioned embodiments is described about the segment-type friction material 1, 1A, 10A, 10B, 10C, 10D that provides twenty segment pieces 3 on the entire circumference of the core metal 2 of the flat ring shape as the segment pieces used in the segment-type friction material, as an example. However, the segment-type friction material according to the invention is not limited to such arrangement. For example, a segment piece having a smaller length or a smaller center angle than the segment piece 3 may be used so that a fixed number of the smaller segment pieces more than twenty are used on the entire circumference of the core metal 2 of the flat ring shape. Alternatively, a segment piece having a larger length or a larger center angle than the segment piece 3 may be used so that a fixed number of the larger segment pieces less than twenty are used on the entire circumference of the core metal 2 of the flat ring shape. Particularly, it is preferable to use segment pieces in a number not less than twenty and not more than forty on the entire circumference of the core metal 2 of the flat ring shape.

Furthermore, each of the aforementioned embodiments is described about the segment-type friction material 1, 1A, 10A, 10B, 10C, 10D that provides the blocks 4 having the four closely joined segment pieces 3 or the blocks 4A having the two closely joined segment pieces 3 as the blocks having plural closely joined segment pieces, as an example. However, the segment-type friction material according to the invention is not limited to such arrangement. Any block may be composed of a desired number of segment pieces closely joined to each other.

The preferred embodiments described herein are illustrative and not restrictive, the scope of the invention being indicated in the appended claims and all variations which come within the meaning of the claims are intended to be embraced therein.

The preferred embodiments described herein are illustrative and not restrictive, the scope of the invention being indicated in the appended claims and all variations which come within the meaning of the claims are intended to be embraced therein.

The invention claimed is:

1. A segment-type friction material comprising:
   a core metal of a flat ring shape; and
   a predetermined number of segment pieces cut out from a friction material substrate and adhered to one surface or both surfaces of the core metal along an entire circumference of the core metal, the predetermined number of the segment pieces being divided into a plurality of divisions, the divisions including at least a block made up of a plurality of the segment pieces joined closely to each other and adhered to the core metal, and
   a plurality of oil grooves being formed between the divisions, respectively, in accordance with required positions and number of the oil grooves,
   wherein the plurality of oil grooves includes a pair of oil grooves being formed at both lateral sides of each of the divisions.

2. A segment-type friction material comprising according to claim 1, in which
   each of the segment pieces has substantially a sector shape with a center angle of about eight to sixteen degrees,
   the divisions includes a plurality of the blocks each made up of a plurality of the segment pieces joined closely to each other and adhered to the core metal, and
   a number of the segment pieces making up each of the blocks being set such that the number and the positions of the oil grooves coincide with the required positions and number of the oil grooves.

3. A segment-type friction material comprising according to claim 1, in which
   each of the segment pieces has substantially a sector shape,
   the predetermined number of the segment pieces is not less than twenty to not more than forty so that the predetermined number of the segment pieces are arranged on the surface of the core metal along the entire circumference of the core metal,
   the divisions includes a plurality of the blocks each made up of a plurality of the segment pieces joined closely to each other and adhered to the core metal, and
   a number of the segment pieces making up each of the blocks being set such that the number and the positions of the oil grooves coincide with the required positions and number of the oil grooves.

4. A segment-type friction material comprising according to claim 1, in which
   the divisions include at least two of a first division made up of a single segment piece, a second division made up of a first plurality of the segment pieces and a third division made up of a second plurality of the segment pieces that is more than the first plurality of the segment pieces, and
   the divisions are arranged on the surface of the core metal along the circumference of the core metal such that the number and the positions of the oil grooves coincide with the required positions and number of the oil grooves.

5. A segment-type friction material comprising according to claim 4, in which a number of the segment piece making up each of the divisions and an arrangement of the divisions along the circumference of the core metal being set such that the number and the positions of the oil grooves coincide with the required positions and number of the oil grooves.

6. A segment-type friction material comprising according to claim 1, in which
   the divisions include at least two of a first division made up of a single segment piece, a second division made up of a first plurality of the segment pieces and a third division made up of a second plurality of the segment pieces that is more than the first plurality of the segment pieces, and
   the divisions are arranged on the surface of the core metal along the circumference of the core metal such that a pitch of the oil grooves becomes uneven along the circumference of the core metal.

7. A segment-type friction material comprising according to claim 1, in which
   each of the segment pieces has substantially a sector shape defined by a right edge, a left edge, an outer circumference and an inner circumference,
   a radius of curvature of the outer circumference and a radius of curvature of the inner circumference of the segment piece are set equal to each other, and
   the predetermined number of the segment pieces is not less than twenty to not more than forty so that the predetermined number of the segment pieces are arranged on the surface of the core metal along the entire circumference of the core metal.

8. A segment-type friction material comprising:
   a core metal of a flat ring shape; and
   a predetermined number of segment pieces cut out from a friction material substrate and adhered to one surface or both surfaces of the core metal along an entire circumference of the core metal, the predetermined number of segment pieces being divided into a plurality of divisions, the divisions including at least a block made up of a plurality of the segment pieces being joined closely to each other and adhered to the core metal, a plurality of oil grooves being formed between the divisions, respectively, in accordance with required positions and number of the oil grooves, while the oil grooves being formed between the divisions, respectively, is a same number as the divisions.

9. A segment type friction material comprising according to claim 8, in which
   the divisions include at least two of a first division made up of a single segment piece, a second division made up of a first plurality of the segment pieces and a third division made up of a second plurality of the segment pieces that is more than the first plurality of the segment pieces, and
   the oil grooves are formed between the divisions in a same number as a number of the blocks or more than the number of the blocks.

10. A segment-type friction material comprising:
    a core metal of a flat ring shape; and
    a predetermined number of segment pieces cut out from a friction material substrate and adhered to one surface or both surfaces of the core metal along an entire circumference of the core metal, the predetermined number of the segment pieces being divided into a plurality of divisions, the divisions including at least a block made up of a plurality of the segment pieces joined closely to each other and adhered to the core metal, a plurality of oil grooves being formed between the divisions, respectively, in accordance with required positions and number of the oil grooves;
    wherein the divisions include at least two of a first division made up of a single segment piece, a second division made up of a first plurality of the segment pieces and a third division made up of a second plurality of the segment pieces that is more than the first plurality of the segment pieces, and
    wherein the divisions are arranged on the surface of the core metal along the circumference of the core metal such that the number and the positions of the oil grooves coincide with the required positions and number of the oil grooves.

11. A segment-type friction material comprising according to claim 10, in which a number of the segment piece making up each of the divisions and an arrangement of the divisions along the circumference of the core metal being set such that the number and the positions of the oil grooves coincide with the required positions and number of the oil grooves.

* * * * *